United States Patent
Hall et al.

(10) Patent No.: US 11,131,464 B2
(45) Date of Patent: Sep. 28, 2021

(54) HYDRONIC PANEL HEATING OR COOLING SYSTEM

(71) Applicants: David R. Hall, Provo, UT (US); Benjamin Jensen, Orem, UT (US)

(72) Inventors: David R. Hall, Provo, UT (US); Benjamin Jensen, Orem, UT (US)

(73) Assignee: Hall Labs LLC, Provo, UT (US)

( * ) Notice: Subject to any disclaimer, the term of this patent is extended or adjusted under 35 U.S.C. 154(b) by 0 days.

(21) Appl. No.: 15/947,035

(22) Filed: Apr. 6, 2018

(65) Prior Publication Data
US 2019/0309959 A1   Oct. 10, 2019

(51) Int. Cl.
| | |
|---|---|
| *F24D 3/14* | (2006.01) |
| *F28F 3/12* | (2006.01) |
| *F24D 3/12* | (2006.01) |
| *F24D 3/02* | (2006.01) |
| *F24D 3/00* | (2006.01) |
| *F24T 10/00* | (2018.01) |
| *F24S 20/00* | (2018.01) |
| *F28F 3/00* | (2006.01) |

(52) U.S. Cl.
CPC ............. *F24D 3/125* (2013.01); *F24D 3/005* (2013.01); *F24D 3/02* (2013.01); *F24D 3/142* (2013.01); *F24S 2020/10* (2018.05); *F24T 2010/50* (2018.05); *F28F 3/00* (2013.01); *F28F 3/12* (2013.01)

(58) Field of Classification Search
CPC ..... F24D 3/02; F24D 3/14; F24D 3/16; F24D 3/147; F28F 3/00; F28F 3/12
USPC ............................ 165/53, 56, 168, 170, 171
See application file for complete search history.

(56) References Cited

U.S. PATENT DOCUMENTS

| | | | | |
|---|---|---|---|---|
| 2,572,972 | A * | 10/1951 | Baldwin | F28F 3/12 165/168 |
| 3,731,736 | A * | 5/1973 | Fernandes | F28D 9/0081 165/166 |
| 3,897,820 | A * | 8/1975 | Teeter, Jr. | E04B 1/74 165/56 |
| 4,217,887 | A * | 8/1980 | Hoffman | F24S 10/502 165/171 |

(Continued)

*Primary Examiner* — Leonard R Leo

(57) ABSTRACT

A hydronic panel and system for heating and/or cooling a room is disclosed. The hydronic panel includes a plurality of contiguous channels. A first chamber is located at a first end, preferably the upper end, of the panel and includes an inlet and communicates with a first subset of the channels. A second chamber is located at an opposite end of the panel and communicates with the first subset and also with a second subset of the channels. A third chamber is located at the first end of the panel, the third chamber communicates with the second subset of the channels and includes an outlet. In this configuration, heated or cooled water flows from the inlet into the first chamber, through the first subset of the channels, to the second chamber, through the second subset of the channels, into the third chamber and out the outlet. Consequently, the heated or cooled water can heat or cool the space. In addition to at least one hydronic panel, the system includes a source of heated and/or cooled water under sufficient pressure to cause the water to flow through the panel. The system also includes a controller to control one or both of the temperature of the water and the flow rate of the water through the panel.

25 Claims, 7 Drawing Sheets

(56) References Cited

U.S. PATENT DOCUMENTS

| | | | | | |
|---|---|---|---|---|---|
| 4,235,679 | A | * | 11/1980 | Swaidan | B01D 5/0066 202/234 |
| 4,898,153 | A | * | 2/1990 | Sherwood | F24S 10/73 126/665 |
| 5,582,238 | A | * | 12/1996 | Plaschkes | F28F 9/0214 165/56 |
| 5,645,045 | A | * | 7/1997 | Breslin | F24S 23/30 126/669 |
| 5,960,869 | A | * | 10/1999 | Tippmann | F28F 3/12 165/171 |
| 8,575,524 | B2 | * | 11/2013 | Meisser | B29B 13/023 219/628 |
| 2007/0186922 | A1 | * | 8/2007 | Guenter | H01L 31/048 126/651 |
| 2008/0264602 | A1 | * | 10/2008 | Newberry | F24D 3/165 165/56 |
| 2008/0314552 | A1 | * | 12/2008 | Rosenkranz | E04C 2/525 165/56 |
| 2011/0100590 | A1 | * | 5/2011 | Isaacs | F24D 3/005 165/56 |
| 2013/0306284 | A1 | * | 11/2013 | Molnar | F28F 3/00 165/168 |
| 2015/0047807 | A1 | * | 2/2015 | Fiedrich | F24D 19/1009 165/56 |

* cited by examiner

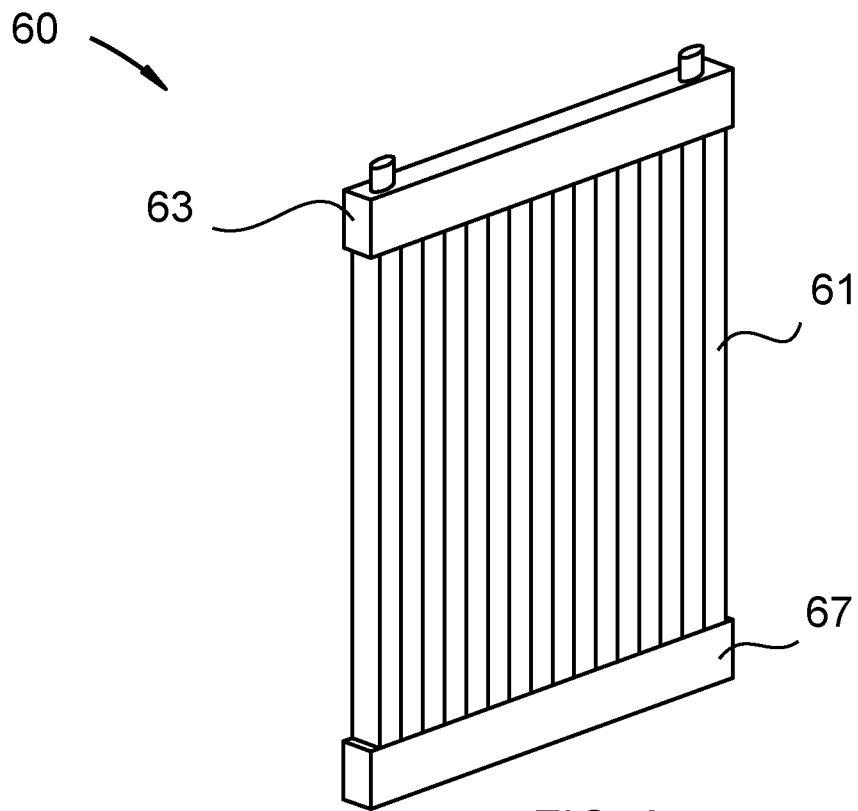
FIG. 6
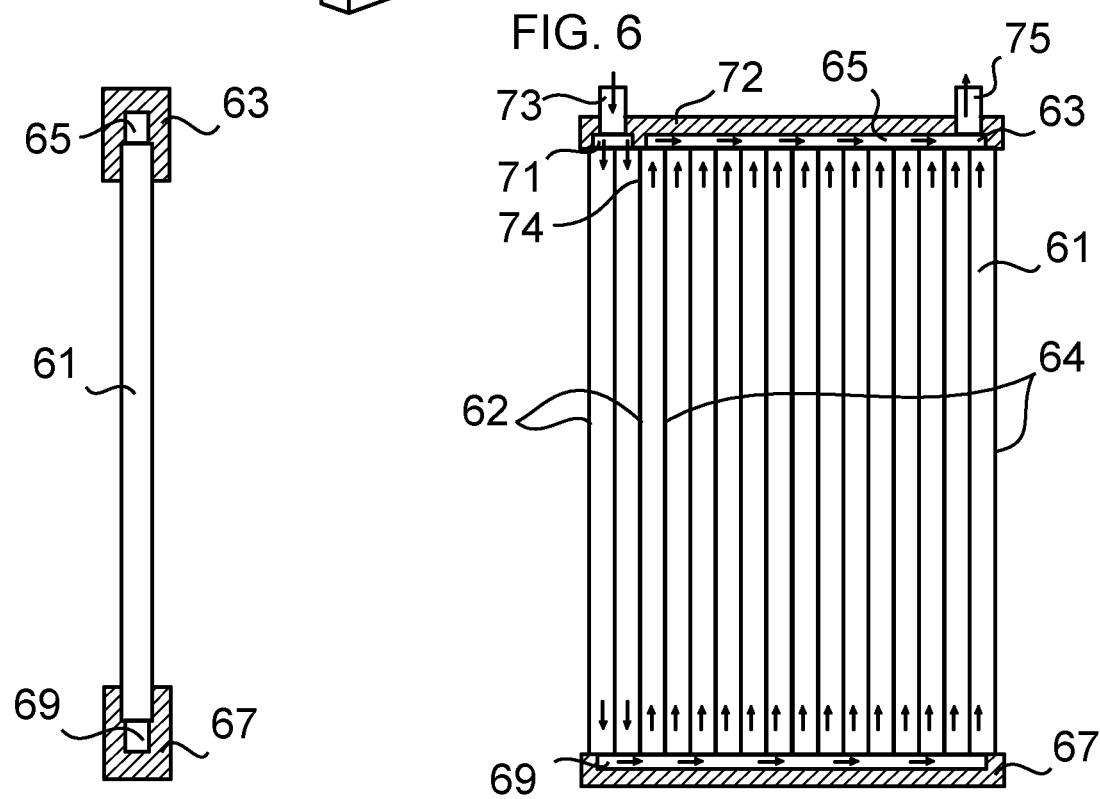
FIG. 7
FIG. 8

HYDRONIC PANEL HEATING OR COOLING SYSTEM

TECHNICAL FIELD

This invention relates generally to the field of heating and cooling systems, and more specifically to hydronic heating and cooling systems.

BACKGROUND

There are many ways to heat or cool living and work spaces. The current art includes at least furnaces, boilers, heat pumps, gas-fired space heaters, electric space heaters, wood-burning or pellet-burning stoves, fire places, ductless heating systems, and radiant heating systems. Of these, radiant heating systems are one of the most advantageous, given that they allow for greater efficiency and zoning, they are silent, and they do not circulate allergens.

Typical radiant heating systems are often standalone units or are installed in floors. Sometimes, they are also installed in walls and ceilings. Some more recent radiant heating systems use PEX (cross-linked polyethylene) pipes—or other types of pipes that are placed throughout the floor, wall, or ceiling- and water, with a controlled temperature, that circulates through the pipes to either heat or cool the surrounding space. However, when the pipes in which the water circulates cover a small portion of the surface area where they are installed, such radiant heating systems may result in uneven heating, especially when objects—such as couches, bookshelves, pictures, or clocks—are placed in front of or over the top of the system. Furthermore, such systems can difficult to construct, install or repair.

SUMMARY

In one aspect, the present invention is a hydronic panel for heating or cooling a space. The hydronic panel includes a plurality of contiguous channels. A first chamber is located at a first end, preferably the upper end, of the panel and includes an inlet and communicates with a first subset of the channels. A second chamber is located at an opposite end of the panel and communicates with the first subset and also with a second subset of the channels. A third chamber is located at the first end of the panel, the third chamber communicates with the second subset of the channels and includes an outlet. In this configuration, heated or cooled water flows from the inlet into the first chamber, through the first subset of the channels, to the second chamber, through the second subset of the channels, into the third chamber and out the outlet. Consequently, the heated or cooled water can heat or cool the space.

In another aspect, the invention is a system for heating and/or cooling a room which includes at least one hydronic panel, and preferably more than one, as described above. The system also includes a source of heated and/or cooled water under sufficient pressure to cause the water to flow through the panel. The system also includes a controller to control one or both of the temperature of the water and the flow rate of the water through the panel.

Preferably, the channels and the chambers are formed within a sheet of twinwall plastic. Also preferably, the source of heated water is a thermal solar panel. Alternatively, heated and/or cooled water are provided by a geothermal exchange.

BRIEF DESCRIPTION OF THE DRAWINGS

The following drawings are provided to illustrate certain embodiments described herein. The drawings are merely illustrative, and are not intended to limit the scope of claimed inventions and are not intended to show every potential feature or embodiment of the claimed inventions. The drawings are not necessarily drawn to scale; in some instances, certain elements of the drawing may be enlarged with respect to other elements of the drawing for purposes of illustration.

FIG. 6 is a perspective view of an alternative embodiment having a top and bottom block.

FIG. 7 is a cross-section showing the configuration of the top and bottom block

FIG. 8 is another cross-section showing the flow of water through this alternative embodiment.

DETAILED DESCRIPTION

The following description recites various aspects and embodiments of the inventions disclosed herein. No particular embodiment is intended to define the scope of the invention. Rather, the embodiments provide non-limiting examples of various compositions, and methods that are included within the scope of the claimed inventions. The description is to be read from the perspective of one of ordinary skill in the art. Therefore, information that is well known to the ordinarily skilled artisan is not necessarily included.

Definitions

The following terms and phrases have the meanings indicated below, unless otherwise provided herein. This disclosure may employ other terms and phrases not expressly defined herein. Such other terms and phrases shall have the meanings that they would possess within the context of this disclosure to those of ordinary skill in the art. In some instances, a term or phrase may be defined in the singular or plural. In such instances, it is understood that any term in the singular may include its plural counterpart and vice versa, unless expressly indicated to the contrary.

As used herein, the singular forms "a," "an," and "the" include plural referents unless the context clearly dictates otherwise. For example, reference to "a substituent" encompasses a single substituent as well as two or more substituents, and the like.

As used herein, "for example," "for instance," "such as," or "including" are meant to introduce examples that further clarify more general subject matter. Unless otherwise expressly indicated, such examples are provided only as an aid for understanding embodiments illustrated in the present disclosure, and are not meant to be limiting in any fashion. Nor do these phrases indicate any kind of preference for the disclosed embodiment.

As used herein, "hydronic" is generally meant to refer to cooling or heating system in which heat is transported using circulating water, although additives, such as algaecides, scale inhibitors, dyes, viscosity modifiers, freeze point depressants and the like can certainly be included with the water.

As used herein, "contiguous" and in "contiguous channels" is generally meant to refer to the channels being separated by a common wall, although the key feature is that the channels are adjacent one another.

As used herein, "heated" as in "heated water" is meant to refer to water that is generally above the ambient temperature of the room.

Likewise, as used herein, "cooled" as in "cooled water" is meant to refer to water that is generally below the ambient temperature of the room.

Figure 1:
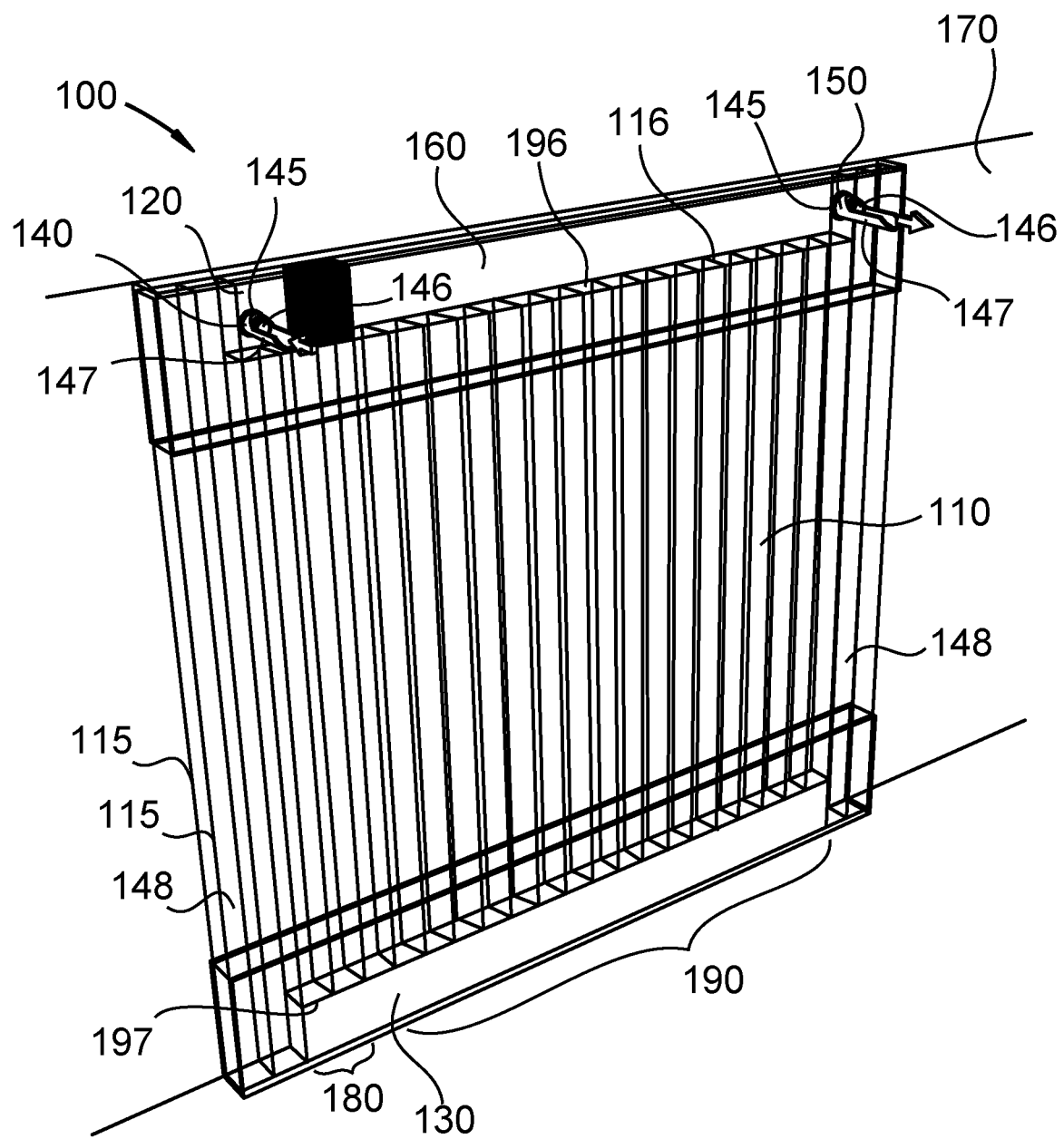
FIG. 1 is a perspective view of one embodiment of a hydronic panel.

FIG. 1 depicts one embodiment of a hydronic panel 100. The hydronic panel 100 comprises a plurality of contiguous channels 110, a first chamber 120 comprising an inlet 140 and communicating with a first subset 180 of the channels 110, a second chamber 130 communicating with the first subset 180 and a second subset 190 of the channels 110, and a third chamber 160 comprising an outlet 150 and communicating with the second subset 190 of the channels. Heated water or cooled water flows from the inlet 140 into the first chamber 120, through the first subset 180 of the plurality of contiguous channels 110, to the second chamber 130, through the second subset 190 of the plurality of contiguous channels 110, into the third chamber 160 and out the outlet 150.

Figure 2:
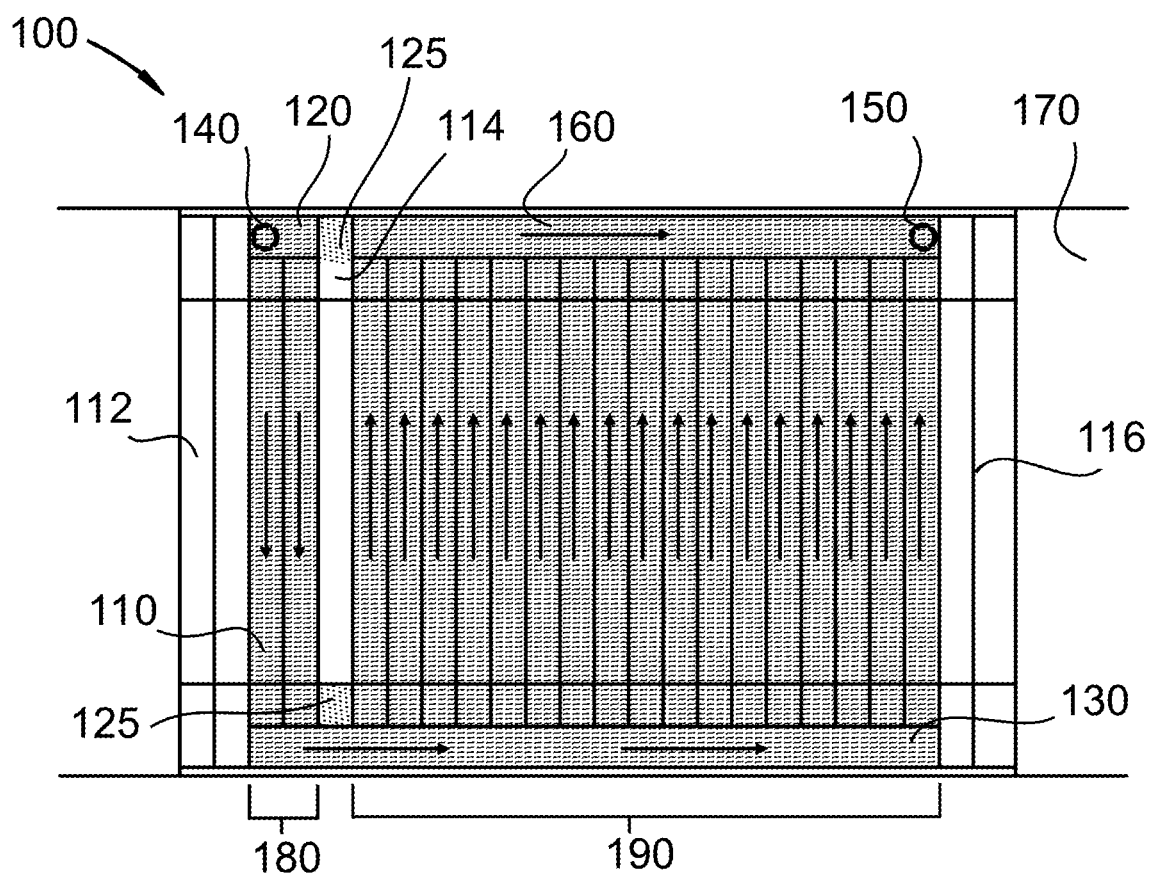
FIG. 2 is a cross-sectional view of one embodiment of a hydronic panel.

Preferably, and as shown in FIGS. 1 and 2, the first chamber 120 and third chamber are located at the top of the panel 100, the second chamber 130 is located at the bottom of the panel 100 and the channels 110 are vertical. Thus, the water preferably flows generally downward through the first subset of the channels and generally upward through the second subset of the channels. As such, gravity and the fact that warmer water rises both enhance the flow through the panel. Alternatively, the chambers are located on the sides of the panel and the channels are horizontal.

When heated water continuously flows through the hydronic panel 100, a controllable amount of heat radiates from the surface of the hydronic panel 100, thereby heating the area around the hydronic panel 100, such as a room. Alternatively, when cooled water continuously flows through the hydronic panel 100, a controllable amount of heat from the room can be absorbed at the surface of the hydronic panel 100, thereby cooling the room. Because the heated or cooled water flows continuously through each of the contiguous channels 110, heat or cool can emanate evenly from the entire hydronic panel 100.

The water that flows through the panel may be plain water or may include additives. Depending on the local water quality, it may be preferable to add antimicrobials, such as algaecides; scale inhibitors; and/or viscosity modifiers. For decorative or maintenance reasons, it may be desirable to add one or more dyes to the water. Finally, depending on ambient temperatures, it may be desirable to add a freeze point depressant, i.e. an antifreeze component, to the water, for example, if the room is allowed to go unheated when unoccupied in cold months.

In one embodiment, the hydronic panel 100 is non-structural and attachable to or detachable from a discrete structural component 170, such as a wall of a building or another structure. The non-structural quality of the hydronic panel 100 in this embodiment makes the hydronic panel 100 easy to install and easy to access for needed repairs. The hydronic panel 100 may be fixedly attached to a discrete structural component 170 by means of fasteners or adhesives. The hydronic panel 100 may be attached within or without the discrete structural component 170. For example, the hydronic panel 100 may be attached to the inner frame of a wall or to wood, cement, metal, or sheetrock panels inside or outside of the wall. The hydronic panel 100 may be covered with sheetrock or paneling or paint or wall paper.

In one embodiment, the hydronic panel 100 is approximately 0.25 inches (about 6 millimeters) thick. In other embodiments, the hydronic panel 100 may be approximately four millimeters thick or ten millimeters thick. In preferred embodiments, the hydronic panel 100 measures between approximately 15 feet high by 50 feet wide, more preferably measuring approximately 8 feet high by 4 feet wide. The latter height and width dimensions conform to the size of a standard sheet of plywood or sheetrock, such that one or more hydronic panels 100 can line a wall after the manner of panels of plywood or sheetrock. In other embodiments, the hydronic panel 100 may be of varying larger or smaller heights and widths, sometimes conforming to the height and width of a discrete structural component 170 to which the hydronic panel 100 is attached, such as a wall. In one embodiment, the hydronic panel 100 covers at least fifty percent of a surface of a discrete structural component 170, such as the wall of a building. In one embodiment, the hydronic panel 100 covers the entire surface of the discrete structural component 170. In another embodiment, one or more hydronic panels 100 may cover at least fifty percent of a surface of a discrete structural component 170, such as a wall. In another embodiment, one or more hydronic panels 100 cover the entire surface of the discrete structural component 170. In one embodiment, one or more hydronic panels 100 may cover just one complete wall of a room. In another embodiment, one or more hydronic panels 100 may cover all of the walls of a room. It is noted that, for convenience in illustrating the inventions, the channels are drawn in the figures much larger than would be preferred when using twinwall plastic.

The hydronic panel 100 comprises a plurality of contiguous channels 110. In one embodiment, the hydronic panel 100 comprises three or more contiguous channels 110. In other embodiments, the hydronic panel 100 may comprise between approximately 5 to 5000 contiguous channels 110. The hydronic panel 100 preferably comprises between approximately 50 to 500 contiguous channels 110, more preferably comprising approximately 250 contiguous channels 110. The plurality of contiguous channels 110 are arranged conterminously in a row, upright and perpendicular to a stationary horizontal plane (such as a floor of a building). In one embodiment, the plurality of contiguous channels 110 comprise hollow rectangular prisms. Preferably, the rectangular prisms have two dimensions measuring less than one inch. Preferably, adjacent rectangular prisms are separated by a common wall.

Each contiguous channel 110 may measure between approximately 0.05 to 10 inches deep, between approximately 0.05 to 10 inches wide, and between approximately 0.5 to 50 feet high, each preferably measuring approximately 0.25 inches deep, 0.25 inches wide, and 8 feet high.

In another embodiment, the plurality of contiguous channels 110 comprise hollow cylinders. The plurality of contiguous channels 110 may comprise other shapes—such as hollow triangular, pentagonal, or hexagonal prisms—in other embodiments.

The plurality of contiguous channels 110 can be formed from plastic, metal, rubber, glass or other heat conductive materials in different embodiments. In a preferred embodiment, the plurality of contiguous channels 110 are formed from twinwall plastic. Twinwall plastic, sometimes referred to as corrugated plastic, is an extruded multi-wall polymer product. It is inexpensive, readily available, and easy to manufacture, making it a highly desirable material for use in creating the hydronic panel 100. Twinwall plastic usually comprises two exterior panels of plastic 115 and an interior support layer comprising perpendicular plastic strips 116 that connect the two exterior panels of plastic 115 in a pattern that creates the plurality of contiguous channels 110. The exterior panels of plastic 115 may be approximately 0.028 inches thick, the perpendicular plastic strips 116 may be approximately 0.01 inches thick, and each contiguous vertical channel 110 may be a rectangular prism measuring approximately 0.25 inches deep and 0.25 inches wide. Each contiguous vertical channel 110 can vary in height, but is preferably as tall as a discrete structural component 170, such as a wall, to which the hydronic panel 100 is attached. The twinwall plastic is preferably made from a polycarbonate. Alternatively, the twinwall plastic may comprise polypropylene, polyethylene terephthalate (PET), or high-dentsity polyethylene (HDPE).

The plurality of contiguous channels 110 are divided into a first subset 180 and a second subset 190. In one embodiment, the number of contiguous channels 110 in the first subset 180 comprises less than ten percent of the total number of contiguous channels 110, preferably comprising approximately two percent of the total number of contiguous channels 110. The first subset 180 of channels may contain as few as one channel. In one embodiment, the first subset 180 of the plurality of contiguous channels 110 comprises approximately five of the contiguous channels 110. In a preferred embodiment, the number of contiguous channels 110 in the first subset 180 is equal to the number of contiguous channels 110 that are equal in size (width) to the diameter of the inlet 140 of the first chamber 120, which may measure one-half inch in diameter. The first subset 180 aligns with the first chamber 120. The first subset 180 communicates with the first chamber 120. Heated or cooled water flows from the inlet 140 of the first chamber 120 into the first chamber 120 and through the first subset 180 of the plurality of contiguous channels 110 to the second chamber 130. The second subset 190 of the plurality of contiguous channels 110, which may comprise all of the plurality of contiguous channels 110 that are not included in the first subset 180, aligns with the third chamber 160. The second subset 190 communicates with the third chamber 160. Heated or cooled water flows from the second chamber 130 through the second subset 190 of the plurality of contiguous channels 100 into the third chamber 160 and out the outlet 150.

As best seen in FIG. 2, when the panel 100 is made from twinwall plastic, there may be some channels formed in the sheet of twinwall plastic, e.g., channels 112, 114 and 116 which are not used to conduct water in the panel. In this depicted embodiment, channels 112 and 116 provide a buffer between the side edges of the panel 100. Channel 114 separates the first subset of channels 180 from the second subset of channels 190.

FIG. 2 also illustrates the preferred configuration wherein the chambers 120, 130 and 160 are fit within spaces made by removing part of the appropriate the dividing walls in the sheet of twinwall plastic. In other words, the outer faces of the sheet of twinwall fabric are left intact and the chambers are fit between them wherein the dividing walls have been removed.

In accordance with an alternative embodiment, the outlet of the third chamber communicates with one or more additional channels, which one or more additional channels either include an outlet from the panel, or communicate with a fourth chamber. Such a fourth chamber may include an outlet from the panel, or may communicate with yet additional channels.

Referring again to FIG. 1, the first chamber 120 and the third chamber 160 are watertight enclosures with hollow internal cavities. In one embodiment, the first chamber 120 and/or the third chamber 160 comprise rectangular prismatic configurations. In other embodiments, the first chamber 120 and/or the third chamber 160 may comprise other configurations, such as triangular prisms, truncated rectangular pyramids, or prisms with a parabolic cross-sectional shape. In one embodiment, the first chamber 120 and/or the third chamber 160 are made by extruding plastic, which may be polycarbonate, by molding it into any of the above-mentioned configurations. In one embodiment, the first chamber 120 and the third chamber 160 have depth dimensions approximately identical to the hydronic panel 100. In one embodiment, the first chamber 120 and the third chamber 160 measure between approximately 0.05 to 5 inches deep, preferably measuring approximately 0.25 inches deep. In one embodiment, the first chamber 120 and the third chamber 160 measure between approximately 0.5 to 10 inches tall, preferably measuring approximately 1.5 inches tall. In one embodiment, the first chamber 120 and the third chamber 160 together measure approximately between 1 to 15 feet wide, preferably measuring approximately 4 feet wide. In one embodiment, the first chamber 120 measures approximately one-half inch wide, and the third chamber 160 measures approximately 3 feet, 11.5 inches wide. In one embodiment, the first chamber 120 is identical in width to the width of the first subset 180 of the plurality of contiguous channels 110, and the third chamber 160 is identical in width to the width of the second subset 190 of the plurality of contiguous channels 110. In one embodiment, the first chamber 120 is aligned with the first subset 180 of the channels 110, and the third chamber 160 is aligned with the second subset 190 of the channels 110, and the subsets and the chambers may share a common partition.

In one embodiment, the first chamber 120 and the third chamber 160 are attached to the plurality of continuous vertical channels 110 and secured by means of a glue, which glue may comprise a mixed-in polycarbonate polymer. The first chamber 120 and the third chamber 160 may be attached separately, or they may be formed from one larger chamber that is separated into the two distinct chambers. In one embodiment, the first chamber 120 and the third chamber 160 are made from a C-channel, which may be extruded from plastic, which may be polycarbonate, and which may be capped and/or sealed (such as by means of a tight cap, glue, or a wall) on each lateral side. The C-channel may be wrapped around an upper edge of the plurality of contiguous channels 110. The plurality of contiguous channels 110 may extend to the top of the C-channel, with the first chamber 120 and the third chamber 160 formed by cutting out the upper edge of the walls of central portions of the plurality of contiguous channels 110, thereby forming two hollow interior cavities (the walls of one vertical channel 110 may be left to divide the two chambers). Alternatively, a portion of the C-channel may not overlap the plurality of continuous vertical channels 110, but rather may extend above the plurality of contiguous channels 110 to form a hollow internal cavity, in one embodiment extending only between approximately 0.05 inches to 5 inches above the upper edge of the plurality of contiguous channels 110, preferably extending approximately 1 inch above the upper edge of the plurality of contiguous channels 110.

In one embodiment, the first chamber 120 and the third chamber 160 may be separated by a plug 125. The plug 125 may stand perpendicularly and span an entire height and depth of the first chamber 120 and the third chamber 160, so as to create a watertight seal between the first chamber 120 and the third chamber 160. In one embodiment, the plug 125 is a rubber plug. In another embodiment, the plug 125 is a wall, which may comprise plastic, such as polycarbonate. The plug 125 may comprise other materials that are capable of forming a watertight seal between the first chamber 120 and the third chamber 160. In one embodiment, the plug 125 extends from the top of the first chamber 120 and the third chamber 160 to the upper edge of the contiguous channels 110, aligning with a wall of one contiguous vertical channel 110, thereby creating a barrier that extends from the top of the first chamber 120 and the third chamber 160 to the bottom edge of the continuous vertical channels 110, which open into the third chamber 130. In this way, the plurality of contiguous channels 110 are partitioned, so that those on one side of the plug 125 constitute a first subset 180, and those on the other side of the plug 125 constitute a second subset 190 of the plurality of contiguous channels 110, the first subset 180 communicating with the first chamber 120, and the second subset communicating with the third chamber 160, but both subsets communicating with and having access to the third chamber 130. In one embodiment, the plug 125 can be removed. In one embodiment, the plug 125 can be moved from a left-hand side of the hydronic panel 100 to a right-hand side of the hydronic panel 100, so that the hydronic panel 100 can be reversible.

The first chamber 120 communicates with the first subset 180 of the plurality of contiguous channels 110, and the third chamber 160 communicates with the second subset 190 of the plurality of contiguous channels 110, such that heated or cooled water can flow directly from the first chamber 120 and/or the third chamber 160 and into the plurality of contiguous channels 110, or from the plurality of contiguous channels 110 and directly into the first chamber 120 and/or the third chamber 160. In one embodiment, the first chamber 120 and/or the third chamber 160 may comprise an opening 196, which may be located on a bottom side of the first chamber 120 and/or the third chamber 160. In one embodiment, the opening 196 extends the length and width of the bottom side of the first chamber 120 and/or the third chamber 160. In other embodiments, the opening 196 may constitute only a portion of the bottom side of the first chamber 120 and/or the third chamber 160. The opening 196 may also be cut into a vertical side of the first chamber 120 and/or the third chamber 160, with a connecting piece angled downward to connect the opening 196 to the plurality of contiguous channels 110. In one embodiment, the opening 196 receives the plurality of contiguous channels 110. In one embodiment, the first chamber 120 and/or the third chamber 160 overlap, extending downward around and enveloping an upper edge of the plurality of contiguous channels 110, and the plurality of contiguous channels 110 protrude slightly inside of and open into the first chamber 120 and/or the third chamber 160. In another embodiment, the first chamber 120 is positioned atop and attached to the first subset 180 of the plurality of contiguous channels 110, spanning the entire width of the first subset 180 of the plurality of contiguous channels 110, and the third chamber 160 is positioned atop and attached to the second subset 190 of the plurality of contiguous channels 110, spanning the entire width of the second subset 190 of the plurality of contiguous channels 110.

The first chamber 120 communicates with the first subset 180 of the plurality of contiguous channels 110, and the third chamber 160 communicates with the second subset 190 of the plurality of contiguous channels 110, such that heated or cooled water can flow directly from the first chamber 120 and/or the third chamber 160 and into the plurality of contiguous channels 110, or from the plurality of contiguous channels 110 and directly into the first chamber 120 and/or the third chamber 160. In one embodiment, the first chamber 120 and/or the second chamber 160 may comprise an opening 196, which may be located on a bottom side of the first chamber 120 and/or the third chamber 160. In one embodiment, the opening 196 extends the length and width of the bottom side of the first chamber 120 and/or the third chamber 160. In other embodiments, the opening 196 may constitute only a portion of the bottom side of the first chamber 120 and/or the third chamber 160. The opening 196 may also be cut into a vertical side of the first chamber 120 and/or the third chamber 160, with a connecting piece angled downward to connect the opening 196 to the plurality of contiguous channels 110. In one embodiment, the opening 196 receives the plurality of contiguous channels 110. In one embodiment, the first chamber 120 and/or the third chamber 160 overlap, extending downward around and enveloping an upper edge of the plurality of contiguous channels 110, and the plurality of contiguous channels 110 protrude slightly inside of and open into the first chamber 120 and/or the third chamber 160. In another embodiment, the first chamber 120 is positioned atop and attached to the first subset 180 of the plurality of contiguous channels 110, spanning the entire width of the first subset 180 of the plurality of contiguous channels 110, and the third chamber 160 is positioned atop and attached to the second subset 190 of the plurality of contiguous channels 110, spanning the entire width of the second subset 190 of the plurality of contiguous channels 110.

The first chamber 120 comprises an inlet 140 and the third chamber 160 comprises an outlet 150. The inlet 140 is a place where heated water or cooled flows into the hydronic panel 100. The outlet 150 is a place where heated or cooled water flows out of the hydronic panel 100, after passing from the inlet 140, into the first chamber 120, through the first subset 180 of the plurality of contiguous channels 110, to the second chamber 130, and through the second subset 190 of the plurality of contiguous channels 110. In one embodiment, heated water or cooled water is moved into the inlet 140 by a pump. In one embodiment, heated or cooled water flows from the inlet 140, into the first chamber 120, through the first subset 180 of the plurality of contiguous channels 110, and to the second chamber 130 by means of gravity. In one embodiment, heated water or cooled water flows from the second chamber 130, through the second subset 190 of the plurality of contiguous channels 110, and out the outlet 150 by means of increasing water pressure and overflow. Gravity pulls the heated or cooled water from the inlet 140 down into and through a first subset 180 of the plurality of contiguous channels 110, running into the second chamber 130. As the second chamber 130 fills, the heated or cooled water flows into the second subset 190 of the plurality of contiguous channels 110. When the second subset 190 of the plurality of contiguous channels 110 is full, the heated or cooled water flows into the third chamber 160, where it overflows and escapes out the outlet 150. The continual movement of the heated water or cooled water causes heat to radiate from the surface of the hydronic panel 100 according to a selected temperature, thereby either heating or cooling an area around the hydronic panel 100, such as a room. The movement of the heated water or cooled water by means of natural forces (gravity and flow caused by increasing water pressure) allows the hydronic panel 100 to operate very economically because it eliminates the need for large motors or large amounts of electricity for operating large pumps to move the water. Instead, the pump that moves water into the inlet 140 can be very small given that the rest of the work of moving the water is done by natural forces.

In one embodiment, the inlet 140 comprises a hole 145, which may be a round hole, in the first chamber 120. In one embodiment, the hole 145 is approximately between 0.2 and 5 inches in diameter, preferably measuring approximately one-half inch in diameter. In one embodiment, the outlet 150 also comprises a hole 145, which may be a round hole, in the third chamber 160, and which may also measure between approximately 0.2 and 5 inches in diameter, preferably measuring approximately one-half inch in diameter. In one embodiment, the inlet 140 and/or the outlet 150 further comprise at least one fitting 146 and at least one tube, hose, conduit or pipe, such as the tube 147. The fitting 146 may be inserted into and secured to the hole 145 at one end and attached to the at least one tube 147 at another end, thereby connecting the tube 147 to the first chamber 120. In one embodiment, the fitting 146 is mechanically attached to the first chamber 120. In one embodiment, the fitting 146 is a straight fitting, such that the tube 147 extends straight out from the upper chamber 120. In this embodiment, the tube 147 and any connected components, such as a pump and a discrete water reservoir, can be hidden from view within the frame of the discrete structural component 170 that supports the hydronic panel 100, such as a wall of a building. In another embodiment, the fitting 146 is an elbow fitting, such that the tube 147 extends from the upper chamber 120 at a right angle, or at another angle between 90-180 degrees. In this embodiment, the tube 147 can be hidden from view within the frame of the discrete structural component 170 that supports the hydronic panel 100, such as a wall, or it can be hidden by means of crown molding.

In one embodiment, the tube 147 has a diameter that is equal in size to the diameter of the hole 145, which may be approximately one-half inch in diameter. In one embodiment, the tube 147 comprises a flexible plastic, such as cross-linked polyethylene (PEX). In another embodiment, the tube 147 comprises another plastic, such as polyvinyl chloride (PVC) or chlorinated polyvinyl chloride (CPVC). In another embodiment, the tube 147 comprises a metal, such as copper or iron. Heated or cooled water may move continuously from the tube 147—which may draw water from a discrete water reservoir, in some embodiments, by means of a pump—through the fitting 146 and the hole 145 and into the first chamber 120 in the case of the inlet 140, or the heated or cooled water may move continuously from the third chamber 120, through the hole 145 and the fitting 146, into the tube 147—by means of gravity and overflow in some embodiments—returning down the tube 147 to a discrete water reservoir, in some embodiments, to be recirculated or drained, in the case of the outlet 150. In some embodiments, the tube is held onto the inlet by a hose clamp.

The inlet 140 and the outlet 150 may be located at many different positions along the first chamber 120 and the third chamber 160. In one embodiment, the inlet 140 and the outlet 150 are located on a vertical side of the first chamber 120 and the third chamber 160. In one embodiment, the inlet 140 and the outlet 150 are located on a front side of the first chamber 120 and the third chamber 160. In another embodiment, the inlet 140 and the outlet 150 are located on a lateral side of the first chamber 120 and the third chamber 160. In a preferred embodiment, the inlet 140 and the outlet 150 are located on the same respective side of the first chamber 120 and the third chamber 160. The inlet 140 and the outlet 150 may be located near the top of the first chamber 120 and the third chamber 160, preferably within the top approximately 1 inch of the first chamber 120 and the third chamber 160. In one embodiment, the inlet 140 and the outlet 150 are located near the outer horizontal edges of the first chamber 120 and the third chamber 160, preferably within 5 inches of the outer horizontal edges of the first chamber 120 and the third chamber 160. In one embodiment, an allowance of unused space 148, which may comprise dead contiguous channels 110, is left beyond the outer horizontal edges of the first chamber 120 and the third chamber 160 and the position of the inlet 140 and the position of the outlet 150. This allowance of unused space may be used to attach the hydronic panel 100 to a discrete structural component 170, such as a wall of a building. Connectors may be inserted through this section of the hydronic panel 100 to attach it to a discrete structural component 170. The inlet 140 opens into the first chamber 120 aligned with the first subset 180 of the continuous vertical channels 110, preferably at the outer edge of the first subset 180, and the outlet 150 opens from the third chamber 160, aligned with the second subset 190, preferably from the outer edge of the second subset 190. In one embodiment, a plug 125 is positioned immediately adjacent to the inner edge of the inlet 140. In one embodiment, the plug 125 can be removed. In this embodiment, the inlet 140 and the outlet 150 can be switched, making the hydronic panel 100 reversible, the plug 125 being always placed next to the inlet 140.

The second chamber 130 is a watertight enclosure with a hollow internal cavity. In one embodiment, the second chamber 130 comprises a rectangular prismatic configuration. In other embodiments, the second chamber 130 may comprise another configuration, such as a triangular prism, a truncated rectangular pyramid, or a prism with a parabolic cross-sectional shape. In one embodiment, the second chamber 130 comprises extruded plastic, which may be polycarbonate, and which may be molded into any of the above-mentioned configurations. In one embodiment, the second chamber 130 has width and depth dimensions approximately identical to the hydronic panel 100. In one embodiment, the second chamber 130 measures between approximately 0.05 to 5 inches deep, inches 1 to 15 inches wide, and 0.5 to 10 inches tall, preferably measuring approximately 0.25 deep, 4 feet wide, and 1.5 inches tall.

The second chamber 130 communicates with the first subset 180 and the second subset 190 of the plurality of contiguous channels 110. In this way, water can flow from the second chamber 130 into each the plurality of contiguous channels 110, or from each of the plurality of contiguous channels into the second chamber 130. In one embodiment, the second chamber 130 communicates with the first subset 180 and the second subset 190 of the plurality of contiguous channels 100 by means of one or more lower openings 197 in the second chamber 130, preferably spanning an upper side of the second chamber 130, but also possibly constituting only a portion of the upper side of the second chamber 130, or being cut into a vertical side of the second chamber 130, with a connecting piece that connects the lower openings 197 and the plurality of contiguous channels 110 by angling upward to meet and receive them. In one embodiment, the second chamber 130 is positioned below the plurality of contiguous channels 110, spanning the entire width of the plurality of contiguous channels 110, including both the first subset 180 and the second subset 190, and thus also the entire width of the hydronic panel 100.

The second chamber 130 may be formed in various ways in differing embodiments. In one embodiment, the second chamber 130 overlaps, extending upward around and enveloping a lower edge of the plurality of contiguous channels 110, of both the first subset 180 and the second subset 190. In one embodiment, the plurality of contiguous channels 110 protrude slightly inside of and open into the second chamber 130. In a preferred embodiment, the second chamber 130 may be formed by wrapping a C-channel, which may be formed from extruded plastic, which may be polycarbonate, and which may be capped and/or sealed (such as with a plastic wall, with a tight cap, or with glue) on each lateral side, around a lower edge of the plurality of contiguous channels 110, the plurality of contiguous channels 110 extending to the bottom of the C-channel, and the lower edge of a central portion of the walls of the plurality of contiguous channels 110 cut out, thereby forming a hollow interior cavity. In another embodiment, the C-channel may be wrapped around the plurality of vertical channels 110 with a portion of the C-channel not overlapping the plurality of continuous vertical channels 110, thereby forming a hollow internal cavity that extends below the plurality of contiguous channels 110, in one embodiment extending only between approximately 0.05 inches to 5 inches below the lower edge of the plurality of contiguous channels 110, preferably extending approximately 1 inch below the lower edge of the plurality of contiguous channels 110. In one embodiment, the second chamber 130 is attached to the plurality of continuous vertical channels 110 and secured by means of a glue, which glue may comprise a mixed-in polycarbonate polymer. In one embodiment, an allowance 148 of dead contiguous channels 110 is left along the outer horizontal edges of the second chamber 130, to the left or right of the positions in the second chamber 130 that are vertically parallel to the positions of the inlet 140 and the outlet 150 of the upper chamber 120. This allowance 148 may be used to attach the hydronic panel 100 to a discrete structural component 170, such as a wall of a building. Connectors may be inserted through this section of the hydronic panel 100 to attach it to a discrete structural component 170.

FIG. 2 depicts a cross-sectional view of one embodiment of the hydronic panel 100. Heated water or cooled water flows from the inlet 140 into the first chamber 120, through the first subset 180 of the plurality of contiguous channels 110, to the second chamber 130, through the second subset 190 of the plurality of contiguous channels 110, and out the outlet 150. In one embodiment, the heated or cooled water is moved into the inlet 140 by a pump. In one embodiment, heated or cooled water flows from the inlet 140, into the first chamber 120, through the first subset 180 of the plurality of contiguous channels 110, and to the second chamber 130 by means of gravity. In one embodiment, heated water or cooled water flows from the second chamber 130, through the second subset 190 of the plurality of contiguous channels 110, and out the outlet 150 by means of increasing water pressure and overflow. Gravity pulls the heated or cooled water from the inlet 140 down into and through a first subset 180 of the plurality of contiguous channels 110, running into the second chamber 130. As the second chamber 130 fills, the heated or cooled water overflows into the second subset 190 of the plurality of contiguous channels 110. When the second subset 190 of the plurality of contiguous channels 110 is full, the heated or cooled water overflows back into the third chamber 160, where it overflows and escapes out the outlet 150. The continual movement of the heated water or cooled water causes heat to radiate from the surface of the hydronic panel 100 according to a selected temperature, thereby either heating or cooling an area around the hydronic panel 100, such as a room. The nature of the overflowing of the heated or cooled water also allows the heated or cooled water to cycle evenly and regularly so that a uniform higher or lower temperature radiating from the hydronic panel 100 can be maintained and also uniformly distributed across the panel. Furthermore, the movement of the heated water or cooled water by means of natural forces (gravity and overflow caused by increasing water pressure) allows the hydronic panel 100 to operate very economically, conserving power, because it eliminates the need for large motors or large amounts of electricity for operating large pumps to move the water. Instead, the pump that moves water into the inlet 140—the only necessary energy supply—can be very small given that the rest of the work of moving the water is done by natural forces.

Figure 3:
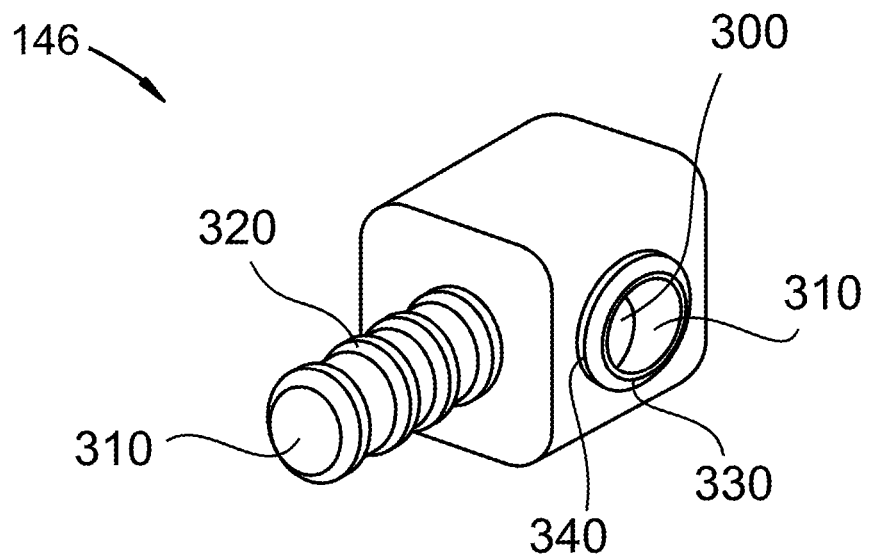
FIG. 3 is a perspective view of one embodiment of a fitting.

FIG. 3 depicts one embodiment of a fitting 146. In one embodiment, the inlet 140 and/or the outlet 150 comprise fitting 146. The fitting 146 may connect tube 147 to the first chamber 120 and/or the third chamber 160 through a hole 145. In one embodiment, the fitting 146 is mechanically attached. In one embodiment, the fitting 146 comprises a through-channel 300 with at least two portals 310, which may protrude from two separate faces, and which may be perpendicular to each other, creating an elbow fitting, or parallel to each other, creating a straight fitting. One portal 310 may comprise a threaded hollow screw 320, which may extend from a first face, to which the tube 147 is attachable, and a second portal 310 may be a protrusion in the shape of a ring 330 with an overhanging rim 340, which may extend from a second face, and which may be dimensioned to fit tightly inside the hole 145. The overhanging rim 340 allows the fitting 146 to attach mechanically inside the hole 145, because the overhanging rim 340, given that it is slightly larger than the diameter of the hole 145, can catch on edges of the hole 145 to hold the fitting 146 securely in place. Glue may also be applied to ensure and seal the fit. The mechanical attachment, however, frees the glue from having to fill both a sealing and attaching function, which means that the glue does not have to be as strong. In one embodiment, the fitting 146 comprises plastic, preferably polycarbonate. In other embodiments the fitting 146 may comprise metal or rubber.

Figure 4:
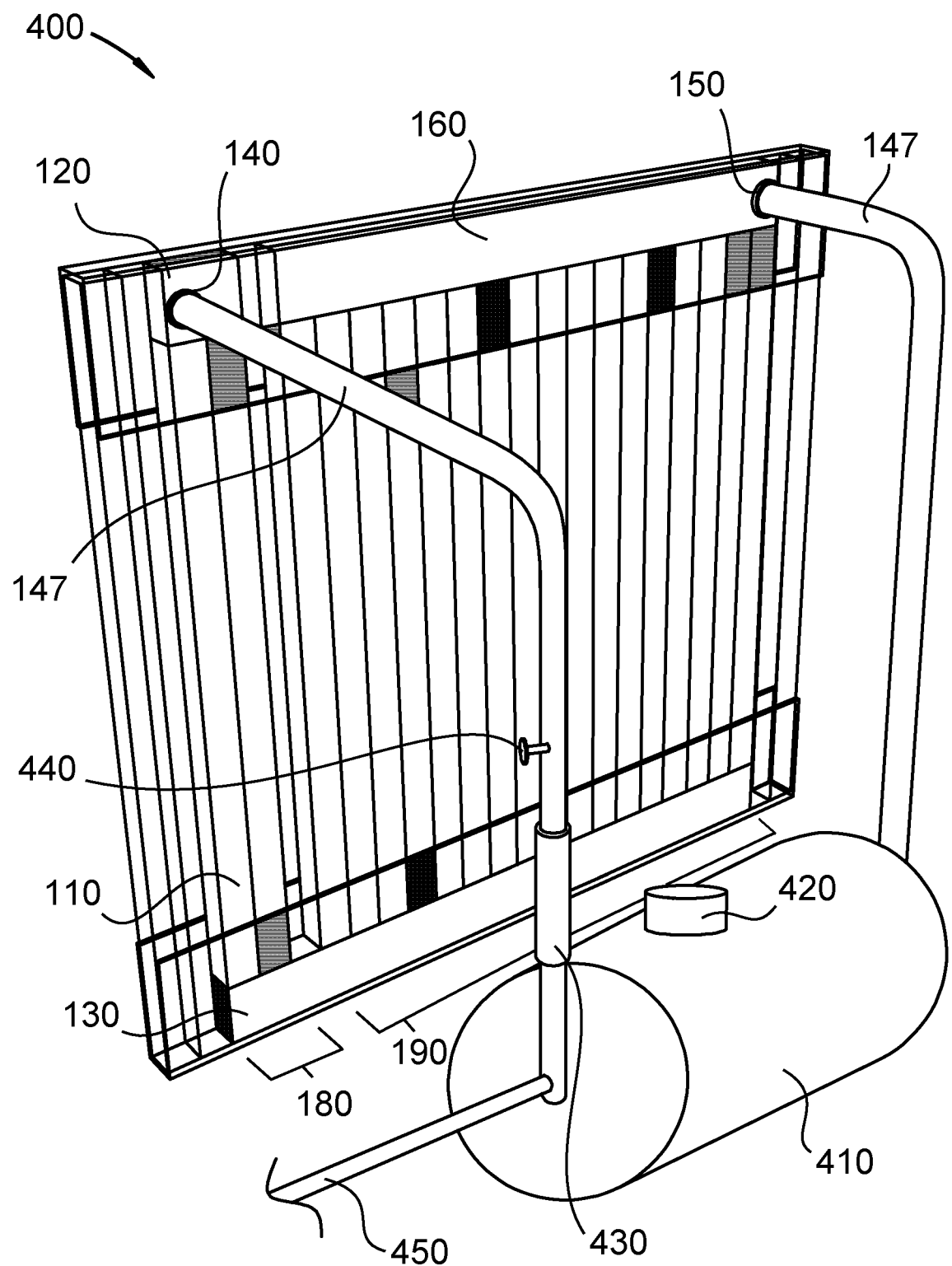
FIG. 4 is a perspective view of one embodiment of a hydronic panel system.

FIG. 4 depicts one embodiment of a hydronic panel system 400. The hydronic panel system 400 comprises a plurality of continuous vertical channels 110, a first chamber 120 comprising an inlet 140 and communicating with a first subset 180 of the channels 110, a second chamber 130 communicating with the first subset 180 and a second subset 190 of the channels 110, a third chamber 160 comprising an outlet 150 and communicating with the second subset 190 of the channels 110, a discrete water reservoir 410, and a heater 420 disposed within the discrete water reservoir 410, wherein heated or cooled water flows continuously from the discrete water reservoir 410, to the inlet 140, into the first chamber 120, through a first subset 180 of the plurality of contiguous channels 110, to the second chamber 130, through a second subset 190 of the plurality of contiguous channels 110, out the outlet 150, and back to the discrete water reservoir 410. The heated or cooled water may be stored in the discrete water reservoir 410 before being moved into the hydronic panel 100. A heater 420 disposed within the discrete water reservoir 410 heats or refrains from heating the heated or cooled water according to a desired temperature. The temperature may be determined by a thermostat or another temperature control device that may be connected to the heater 420, whether by wires or wirelessly. The heated or cooled water may be moved from the discrete water reservoir 410 through tube 147, of which the inlet 140 may be comprised. The heated or cooled water may be moved from the discrete water reservoir 410 to the inlet 140 by a pump 430, which may be attached to the tube 147. The pump 430 may be an electric pump. The movement of the heated or cooled water from the discrete water reservoir 410 to the inlet 140 may be controlled by a valve 440, which can be turned off or on, stopping or starting the flow of the heated or cooled water. After moving into the inlet 140 and cycling through the hydronic panel 100, the heated or cooled water moves out the outlet 150 and back to the discrete water reservoir 410. The heated or cooled water may move out the outlet 150 through tube 147, of which the outlet 150 may be comprised. When the heated or cooled water returns to the discrete water reservoir 410, it may then be recirculated, or drained through a drainage pipe 450 and replaced.

In one embodiment, the discrete water reservoir 410 is an enclosed container. In one embodiment, the discrete water reservoir 410 is a water tank. In other embodiments, the discrete water reservoir 410 is a barrel, a bucket, a can, a tub, or a basin. In one embodiment, the discrete water reservoir 410 holds approximately four or more gallons of water. In one embodiment, the water is infused with an anti-freeze additive, such as a glycol, preferably propylene glycol, in a closed system, to keep from freezing. In one embodiment, the discrete water reservoir 410 is a geothermal reservoir below the ground. In this embodiment, the heated or cooled water flows up and down through wells in the ground, where the heated or cooled water adjusts to the average underground water temperature. In one embodiment, the discrete water reservoir 410 and any connecting pipes 147 are hidden behind a wall, such as within the frame of a wall, so that they are not visible.

Figure 5:
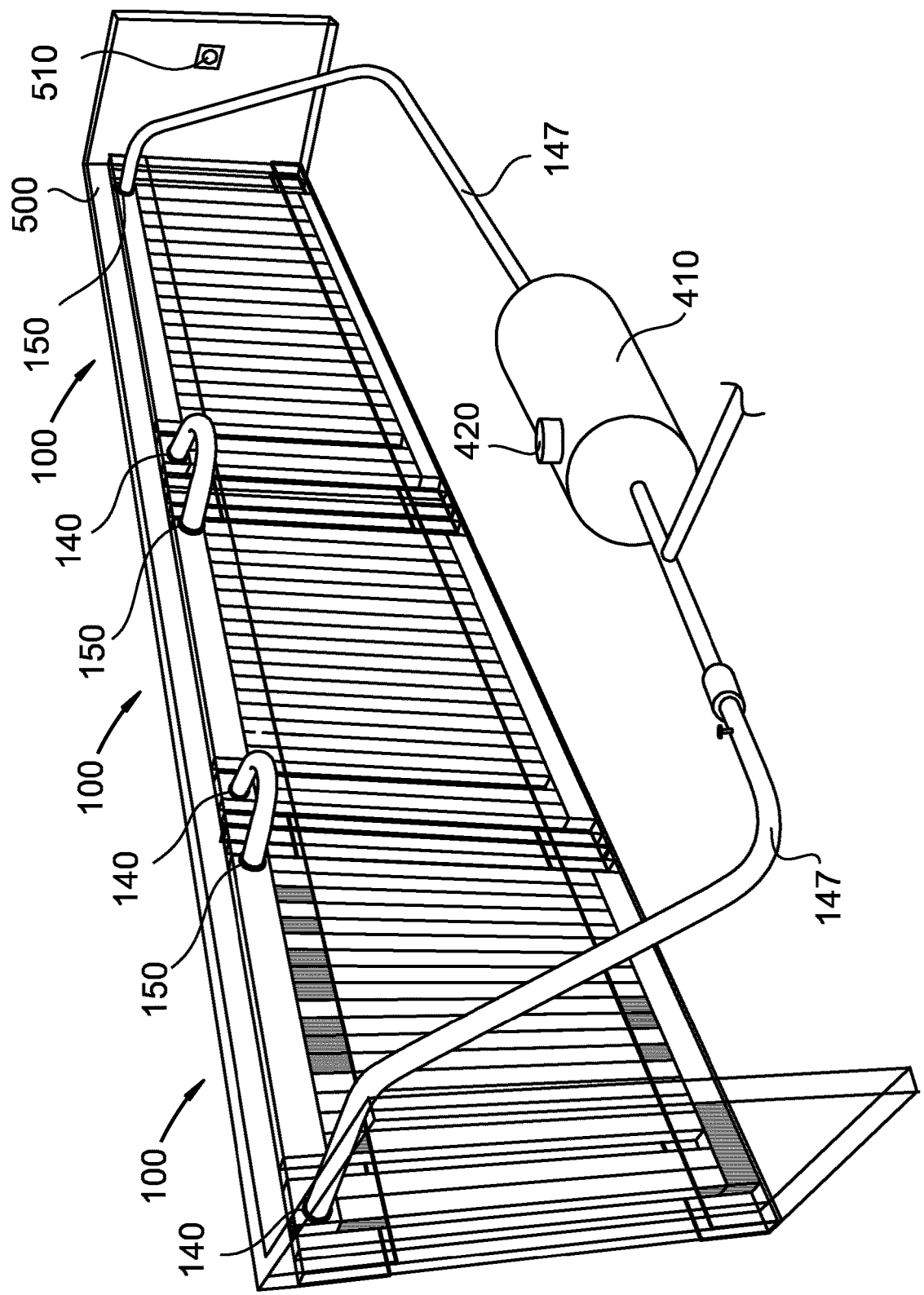
FIG. 5 is a perspective view of one embodiment of several hydronic panels extending over a wall of a room.

FIG. 5 depicts one embodiment of several hydronic panels 100 extending over a wall 500 of a room, providing radiant heating and cooling to the room. In one embodiment, all of the hydronic panels 100 are connected to a common discrete water reservoir 410. In one embodiment, tube 147 moves the heated or cooled water from the discrete water reservoir 410 through the inlet 140 of a first hydronic panel 100. The outlet 150 of the first hydronic panel 100 and the inlet 140 of the second hydronic panel 100 may be connected, such as by means of tube 147, such that the heated or cooled water moves continuously from the outlet 150 of the first hydronic panel 100 directly into the inlet 140 of the second hydronic panel 100. Subsequent hydronic panels 100 may also be added in the same fashion, creating a chain of hydronic panels 100 that may extend over a wall 500 of a room. In one embodiment, the heated or cooled water moves continuously from the outlet 150 of the last hydronic panel 100 in the chain and back into the discrete water reservoir 410, where it may be recirculated or drained. The temperature of the heated or cooled water may be controlled by a thermostat 510 or another temperature control device, which may be connected, by wires or wirelessly, to a heater 420 disposed within the discrete water reservoir 410.

Turning now to FIG. 6, an alternative embodiment of a hydronic panel 60 is shown. In this embodiment, the contiguous channels 61 are provided in the form of a 4'×8' sheet of twinwall plastic. A top block 63 and a bottom block 67 are attached by water-tight means to the top and bottom of the sheet of twinwall plastic, respectively. As seen in FIG. 7, the blocks 63 and 67 preferably hang over the sides of the twinwall plastic.

Preferably, the blocks are molded from a material that facilitates this water-tight seal. For convenience in fabrication, thermoplastic polymers that are stable for extended water contact are preferred. Suitable materials include polyethylene, such as high density (HDPE), polypropylene, and polycarbonate.

Referring now to FIG. 8, the top block 63 includes an inlet 73 and a first chamber 71. The first chamber is open to a first subset of the channels 62, in this embodiment, the first two channels in the twinwall plastic. The bottom block 67 includes a second chamber 69, which is open to the first subset of channels 62 and the second subset of channels 64. The top block also includes a third chamber 65, which is open to the second subset of channels 64. The top block 63 also includes an outlet 75, which is open to the third chamber 65.

Preferably, the inlet 73 and the outlet 75 have identical dimensions, so that either one can serve as an inlet or an outlet. In this way, the system is non-handed, i.e. the panels can be hung with the water flowing in either direction. This may be particularly desirable in a system that uses more than one source of heated or cooled water.

In this embodiment of FIGS. 6, 7 and 8, the top block includes a wall 72 between the first and third chamber that meets the wall 74 of the twinwall plastic between the first and second set of channels and creates a seal therebetween. Alternatively, other means, such as a resilient plug, can be used to separate the first and third chambers and the first and second subset of channels. Also, it may be more practical to separate the first and second subsets by closing off both ends of the channel in the twinwall plastic between the subsets, as shown in FIG. 2.

Figure 9:
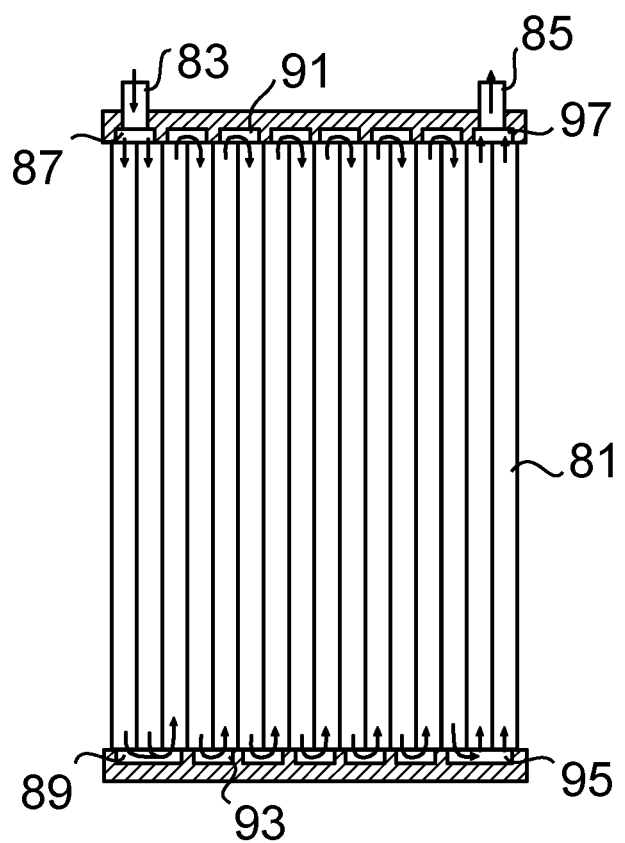
FIG. 9 is a cross-section showing the flow of water through an other alternative embodiment.

FIG. 9 is a cross-section of an an other embodiment of the invention, which embodiment also includes a top and bottom block attached with water-tight seals to a sheet of twinwall plastic. In this embodiment, the top block 82 and bottom block 94 include several more chambers to provide a longer path for the water through the hydronic panel. In particular, the top block 82 includes an inlet 83, which is open to a first chamber 87. The first chamber is open to a first the channels 81 in a first subset 84, in this case two channels. Those two channels flow into the second chamber 89 in the bottom block 94. The second chamber 89 is open to a second subset of channels 96. In this embodiment, the second subset 96 includes only one channel. That channel 96 flows into the third chamber 91 in the top block 82. That third chamber 91 includes an outlet 90, which flows into a third subset of channels 98. Again, in this embodiment depicted in FIG. 9, this third subset of channels 98 includes only one channel. This channel 98 flows into fourth chamber 93 in the bottom block 94. The fourth chamber 93 includes an outlet which flows into channel 99. This pattern is repeated until the water flows into chamber 95 in the bottom block 94, which chamber is open to the last two channels 80. The water flows through these channels 80 into the chamber 97 in the top block 82 and out of the panel through outlet 85.

Variations on this alternative embodiment of FIG. 9 can be made. For example, the chambers, such as 91, and be enlarged so as to communicate with more than two channels. Also, instead of providing the outlet from the panel in the top block, it can also be provided in the bottom block. In this way, each hydronic panel is symmetrical about a horizontal line, i.e. can be flipped without changing the orientation of the inlet and outlet.

This embodiment of FIG. 9 may provide advantages in some situations. For example, the longer path for the water increases the residence time of the water in the hydronic panel. In addition, providing a longer path through the panel may be helpful in evening out the temperature from one side of the panel to the other. Also, the embodiment of FIG. 9 is symmetrical about a vertical line. As such, it can be flipped and water can introduced into the panel from either side and water can leave the panel from either side. In other words, the inlet and outlet can be swapped.

Figure 10:
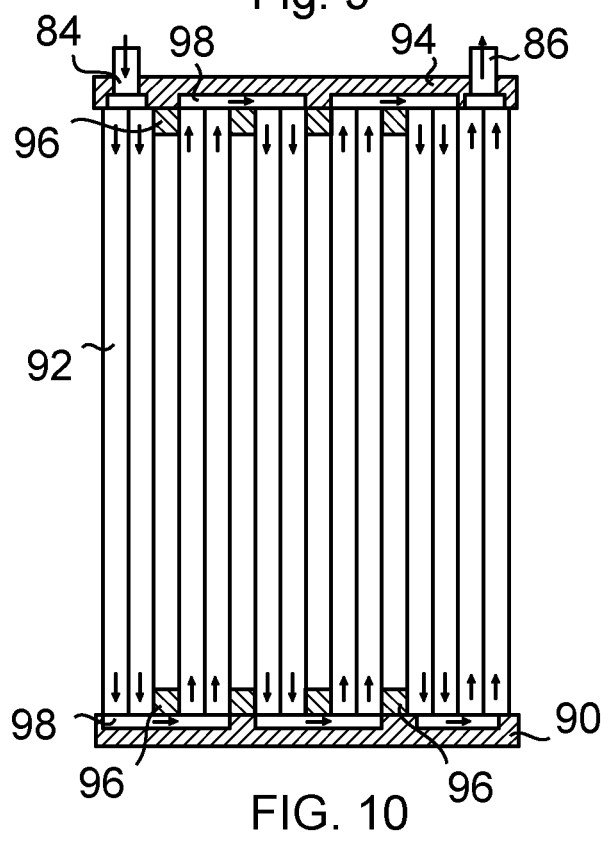
FIG. 10 is a cross-section showing the flow of water through a further alternative embodiment.

FIG. 10 is a cross-section similar to FIGS. 8 and 9, but showing an alternative embodiment. Heated or cooled water passes into the panel through inlet 88, through the top block 94 and down the first two channels 92. The water then passes through into the chamber 98 formed in the bottom block 90. Several plugs 96 are inserted into channels to block off those channels and thereby direct the flow of the water. Preferably, the plugs 96 are made from a resilient material, such as a thermoplastic elastomer, rubber, polyurethane, silicone, closed-cell foam. If sized properly, and made of sufficiently resilient material, the plugs 96 can be held in place by an interference fit. Alternatively, the plugs can be held in place by an adhesive or mechanical means. In the embodiment shown in FIG. 10, there are four plugs 96 at the tops of channels and four plugs 96 at the bottoms of channels to create the down-up-down-up-down-up flow pattern.

Figure 11:
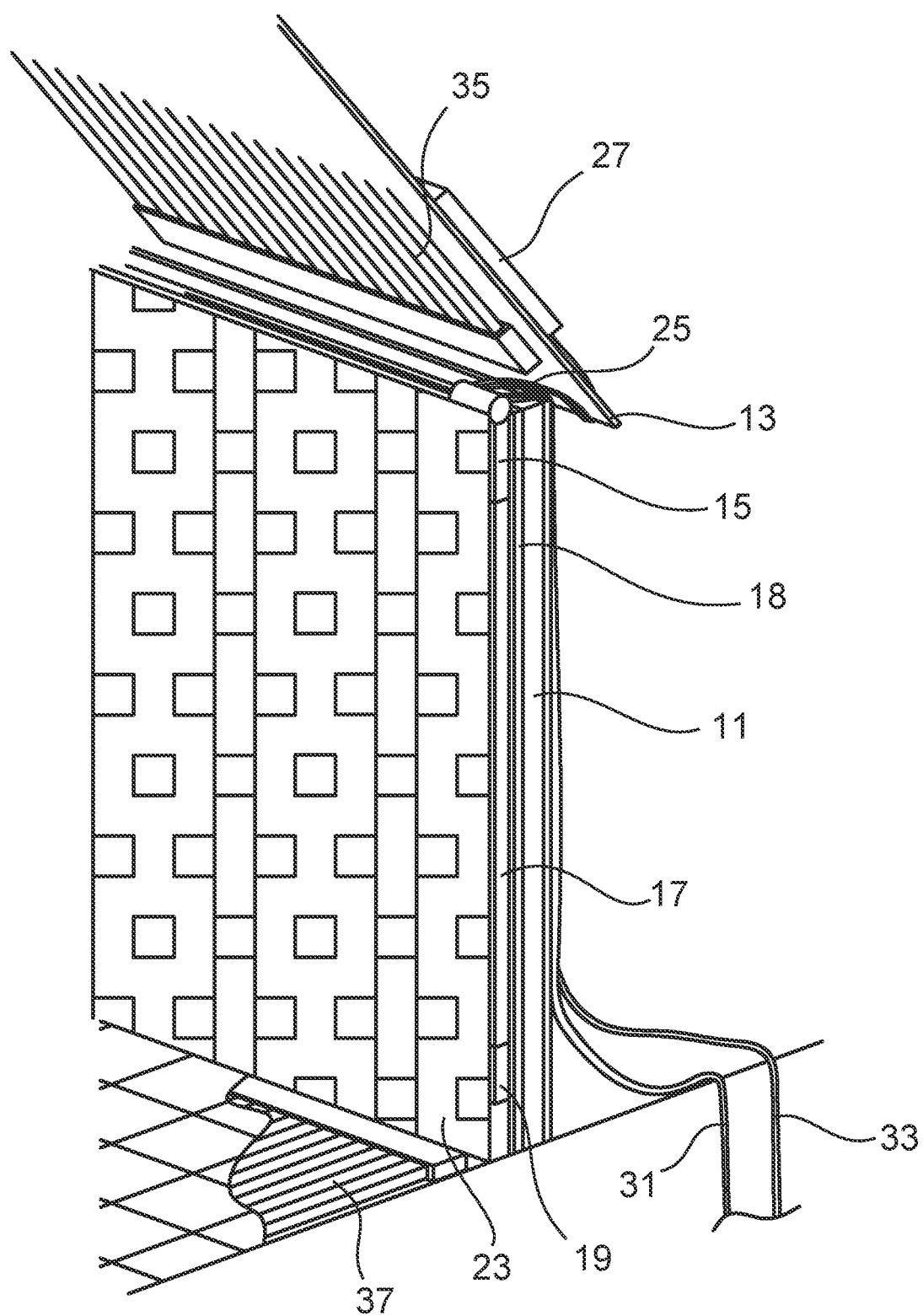
FIG. 11 is a perspective, cut-away view showing a system of the present invention making use of a solar thermal cell and a geothermal heat exchange.

FIG. 11 illustrates the system of the present invention installed and configured to heat and cool a room in a residence. The room includes a wall 11 and a roof 13. A hydronic panel is mounted on the inside of the wall 11. The hydronic panel includes a top block 15, vertical contiguous channels 17 and a bottom block 19. When the pump is activated, water flows from the heat/cooling sources and through the panel.

In alternative embodiments, the hydronic panel is part of the ceiling 35 in a room, either by attaching it to an existing ceiling or by attaching it to the joists or other structure to form a ceiling. In other alternative embodiments, the hydronic panel is part of the floor 37 of a room, by either laying it on top of an existing floor or by laying it on top of the slab, joists or other structure to form a floor. Heat conductive tile or other flooring material can be laid on top of the hydronic panel.

The system also preferably includes a decorative cover 23 that hides the hydronic panel and is made of a heat conductive material. Preferably, a variety of decorative covers are made available to the installer, so as to provide the aesthetic for the room. For example, the decorative cover may simulate wall paper, or wood paneling. It may also be offered in several colors. Alternatively, the decorative cover may be paintable or may be suited for attaching wall paper to it.

Preferably, the hydronic panel also includes a backing material 18 between the panel and the wall it is attached to. Such a backing material serves to insulate or reflect the heat or cool to make the system more energy efficient.

The embodiment of FIG. 11 includes a solar thermal panel 27 for providing heated water. The solar thermal panel 27 is mounted on the roof, with lines 25 for passing water to be heated and heated water between the solar thermal panel 27 and the hydronic panel.

The system in FIG. 11 also includes a geothermal heat exchange, with line 31 passing water into a line, pipe or reservoir in the ground (not shown) and line 33 passing water back up to the hydronic panel. In this water, and depending on the season, water can either be heated or cooled to the temperature of the ground.

Alternatively, an electric or gas-powered water heater can be added to the system shown in FIG. 11. Such a heater could be relatively small and efficient, since it is heating such a small stream of water.

Preferably, the system includes a controller that works with temperature sensors and user inputs to control the flow of heated/cooled water through the panel to achieve the desired temperature in the room. More preferably, the system includes both sensor(s) to determine the temperature of the heated or cooled water and sensor(s) to determine the ambient temperature of the room. Preferably, the controller can turn the pump on and off to control water flow. More preferably, in addition to turning the pump on and off, the controller can vary the speed of the pump to adjust the flow rate of the water through the panel. The controller is preferably configured to respond to direct instructions from a user. More preferably, the controller is also configured to carryout pre-programmed instructions. Most preferably, the controller can be programmed from a user's smart device, such as a mobile phone or tablet.

If the system includes more than one source of heated and/or cooled water, as shown in FIG. 11, the controller is preferably configured to actuate a valve to select the source. Alternatively, the system may include a manual valve. For example, during cooler months, the valve may be set to use the solar thermal panel as a source of heated water. During the warmer months, the valve may be set to use the geothermal exchange as a source of cooled water.

In an alternative embodiment, the system may use two sources of heated water in combination. For example, in cold weather, the controller may act to send water to be pre-heated by the geothermal exchange and then pass the pre-heated water through the solar thermal heat panel to get to the desired temperature to pass through the hydronic panel.

In an alternative embodiment, the source of heated and cooled water may be the conventional water lines in a residence or other building. In such an embodiment, valving of hot water, i.e. from a line connected to a conventional water heater, through the hydronic panel can provide the source of heated water. Since the hot water is already under sufficient pressure to cause flow through the pipes in the building, there would be no separate pump needed for the system. Likewise, if cooling is desired, valving of cold water through the hydronic panel can be used. If the water is coming directly from a well, the water can easily be 30° F. or more lower than the outside air temperature. Consequently, simply running some water from the cold-water line may provide sufficient cooling through the panel. In this alternative embodiment using the conventional hot and cold-water lines, the control of the panel is accomplished by valving, selecting the source of water, and controlling the rate of the water flow through the panel. Preferably, this valving is done by a controller, either in response to direct user input or in accordance with pre-programmed instructions. Alternatively, the valving can be done by hand.

In this alternative embodiment using conventional hot-water and cold-water lines, the water, after passing through the panel, may be returned to the water system of the building, for example to the water heater. Naturally, this would require that the panel and all of its lines be sealed and completely sanitary. Alternatively, after the water flows through the panel, it may be directed to other uses in or around the residence or other building. For example, the water may flow into a system to irrigate plants inside or outside the residence.

Depending on the range of temperatures the water may see in the system, it may be preferable to account for expansion and/or contraction due to temperature variation. For example, it may be preferable to include a resilient reservoir that can tolerate expansion and contraction of the water in the system. Likewise, it will be desirable to use connection lines and fittings that tolerate expansion and contraction.

The invention has been described with reference to various specific and preferred embodiments and techniques. Nevertheless, it understood that many variations and modifications may be made while remaining within the spirit and scope of the invention.

What is claimed is:

1. A hydronic panel heating system for heating a room comprising:
   a panel comprising:
   a plurality of contiguous channels;
   a first chamber at a first end of the panel and comprising an inlet and communicating with a first subset of the channels;
   a second chamber at an opposite end of the panel and communicating with the first subset and a second subset of the channels; and
   a third chamber at the first end of the panel, the third chamber comprising an outlet and communicating with the second subset of the channels;
   a heater that heats water in fluid communication with the panel; and
   a pump for causing heated water to flow through the contiguous channels in the panel;
   wherein the panel is attached to an inside surface of a vertical wall of a room, and the contiguous channels are vertical;
   wherein heated water from the heater flows through the inlet into the first chamber, through the first subset of the channels, to the second chamber, through the second subset of the channels, into the third chamber and out the outlet, whereby the room is heated by radiant heat from the heated water flowing through the panel; and
   wherein at least some of the channels are blocked by plugs at both ends to thereby direct the flow of water through the panel.

2. The system of claim 1 wherein the first end is an upper end of the panel and the second end is a lower end of the panel, such that the water flows generally downward through the first subset of the channels and generally upward through the second subset of the channels.

3. The system of claim 1, further comprising a decorative outer surface suitable to be the visible surface of the panel.

4. The system of claim 1 further comprising a layer of heat insulating and/or heat reflecting material on the side of the panel facing away from the room.

5. The system of claim 1 further comprising one or more other panels, and wherein the combination of the hydronic wall panels cover more than 50 percent of the surface of the wall.

6. The system of claim 1 wherein the heater is a solar thermal panel.

7. The system of claim 1 wherein the heater is a geothermal heat exchange.

8. The system of claim 1 wherein a heating output of the panel is controlled by adjusting one or both of the temperature of the water and flow rate through the panel.

9. The system of claim 1, wherein the first chamber and the third chamber are separated by a plug.

10. The system of claim 1, wherein the first subset of the channels comprises less than ten percent of the total number of the channels.

11. The system of claim 1 wherein adjacent channels are separated by a common wall.

12. The system of claim 1, wherein the plurality of contiguous channels are hollow rectangular prisms with two dimensions measuring less than one inch.

13. The system of claim 1, wherein the plurality of contiguous channels is formed from twinwall plastic.

14. The system of claim 1, wherein the first and third chamber are provided in a first block attached to one end of the contiguous channels and wherein the second chamber is provided in a second block attached to the opposite end of the contiguous channels.

15. The system of claim 1 further comprising at least one additional panel and wherein the outlet of the panel is in fluid communication with an inlet of the at least one additional panel.

16. The system of claim 15 wherein the panels form at least 75% of the vertical wall.

17. A method for heating a room comprising:
   pumping water through a heater wherein the water is heated;
   pumping the heated water through an extruded panel having contiguous channels disposed in a room to be heated;
   wherein the heated water is pumped through the extruded panel so that it first passes through a first chamber at a first end of the extruded panel, then passes through a first subset of the channels, then passes through a second chamber disposed at a second end of the extruded panel opposite from the first end, then passes through a second subset of the channels, and then passes through a third chamber at the first end of the extruded panel;
   wherein at least some of the channels are blocked by plugs at both ends to thereby direct the flow of water through the panel;
   wherein the room receives radiant energy from the heated water through a surface of the extruded panel facing toward the room.

18. The method of claim 17, wherein the heated water passes from the third chamber through a third subset of the channels.

19. The method of claim 18, wherein the heated water passes from the third subset of the channels through a fourth chamber at the second end of the extruded panel.

20. The method of claim 19, wherein the heater water passes from the fourth chamber through an outlet to thereby exit the extruded panel.

21. A method for making a hydronic panel heating system:
   providing an extruded panel, having contiguous, fluid-tight, parallel channels running from a first end of the extruded panel to a second, opposite end of the extruded panel;
   adding a first chamber to the first end of the extruded panel, which is in fluid communication with a water inlet and first subset of channels;
   adding a second chamber to the second end of the extruded panel, which is in fluid communication with the first subset of channels and with a second subset of channels;
   adding a third chamber at either the first end or the second end of the extruded panel, which is in fluid communication with at least some of the channels and a water outlet;

providing blocks at both ends of at least some of the channels to thereby direct the flow of water through the panel;

providing a heater for heating water; and providing a pump for pumping heated water through water inlet, the chambers, the channels and the water outlet.

22. The method of claim 21 wherein the first, second and third chambers are formed from C-channels.

23. The method of claim 21 wherein the extruded panel is extruded to form a first major wall and a second major wall, and a series of channel-forming walls connecting the first and second major walls.

24. The method of claim 23, wherein the first, second and third chambers are at least partially formed by removing end portions of at least some of the channel-forming walls, to thereby create spaces between the first and second major walls.

25. The method of claim 24, further comprising placing plugs within the spaces to complete the first, second and third chambers.

* * * * *